United States Patent
Abe et al.

(10) Patent No.: US 9,724,758 B2
(45) Date of Patent: *Aug. 8, 2017

(54) APPARATUS FOR PRODUCING AN INTEGRALLY LAMINATED THREE-DIMENSIONAL OBJECT BY REPEATING FORMATION OF POWDER LAYER AND SOLIDIFIED LAYER

(71) Applicant: PANASONIC INTELLECTUAL PROPERTY MANAGEMENT CO., LTD., Osaka (JP)

(72) Inventors: Satoshi Abe, Moriguchi (JP); Yoshikazu Higashi, Moriyama (JP); Isao Fuwa, Osaka (JP); Masataka Takenami, Kadoma (JP); Norio Yoshida, Kitakatsuragi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/806,717

(22) Filed: Jul. 23, 2015

(65) Prior Publication Data

US 2015/0321256 A1    Nov. 12, 2015

Related U.S. Application Data

(63) Continuation of application No. 12/461,176, filed on Aug. 4, 2009, now Pat. No. 9,156,056.

(30) Foreign Application Priority Data

Aug. 5, 2008    (JP) .................................. 2008-202050

(51) Int. Cl.
   B05C 19/04    (2006.01)
   B22F 3/105    (2006.01)
   (Continued)

(52) U.S. Cl.
   CPC .............. B22F 3/1055 (2013.01); B05C 5/02 (2013.01); B05C 9/14 (2013.01); B05C 11/028 (2013.01);
   (Continued)

(58) Field of Classification Search
   CPC ... B05C 19/04; B22F 3/1055; B29C 67/0077; B29C 67/0092; B05B 5/1683; B05D 1/06; B33Y 30/00
   See application file for complete search history.

(56) References Cited

U.S. PATENT DOCUMENTS 4,665,492 A    5/1987    Masters
4,867,774 A *  9/1989    Dorn ....................... C03B 19/06
                                                            264/1.21
(Continued)

FOREIGN PATENT DOCUMENTS

DE    44 00 523 A1    7/1995
DE    102 35 434 A1    2/2004
(Continued)

OTHER PUBLICATIONS

German Office Action in corresponding German Application No. 102009036195.2 dated Sep. 26, 2013 and English translation thereof.
(Continued)

*Primary Examiner* — Karl Kurple
(74) *Attorney, Agent, or Firm* — Bacon & Thomas, PLLC

(57) ABSTRACT

An apparatus for producing a laminated object, includes a powder layer forming unit for forming a powder layer of a powdery material, a material supply unit for feeding the powdery material to the powder layer forming unit; and a solidified layer forming unit for forming a solidified layer by irradiating a light beam on a specified portion of the powder layer and sintering or melting the specified portion of the
(Continued)

powder layer. The apparatus is configured to produce an integrally laminated three-dimensional object by repeating formation of the powder layer and formation of the solidified layer. The material supply unit includes a cartridge unit charged with the powdery material, the cartridge unit being configured to allow the powdery material to drop downwards.

12 Claims, 7 Drawing Sheets

(51) Int. Cl.
  B05C 11/02    (2006.01)
  B05C 5/02     (2006.01)
  B05C 9/14     (2006.01)
  B29C 67/00    (2017.01)
  B33Y 30/00    (2015.01)
(52) U.S. Cl.
  CPC .......... B05C 19/04 (2013.01); B29C 67/0077
        (2013.01); B22F 2003/1056 (2013.01); B22F
             2999/00 (2013.01); B33Y 30/00 (2014.12);
                          Y02P 10/295 (2015.11)

(56) References Cited

U.S. PATENT DOCUMENTS

| | | |
|---|---|---|
| 5,149,548 A | 9/1992 | Yamane et al. |
| 5,252,264 A | 10/1993 | Forderhase et al. |
| 5,370,692 A | 12/1994 | Fink et al. |
| 5,397,605 A * | 3/1995 | Barbieri ............... B05D 1/06 239/3 |
| 5,510,066 A * | 4/1996 | Fink ..................... C08G 18/48 156/242 |
| 5,633,021 A | 5/1997 | Brown et al. |
| 5,647,931 A | 7/1997 | Retallick et al. |
| 5,666,194 A | 9/1997 | Denton |
| 5,797,520 A | 8/1998 | Donahue |
| 6,145,972 A * | 11/2000 | Udagawa ............. B41J 2/17513 347/86 |
| 6,155,457 A | 12/2000 | Landa et al. |
| 6,170,939 B1 | 1/2001 | Ujita et al. |
| 6,533,861 B1 | 3/2003 | Matsuda et al. |
| 6,623,579 B1 | 9/2003 | Smith et al. |
| 6,657,155 B2 | 12/2003 | Abe et al. |
| 6,673,386 B2 | 1/2004 | Komyoji et al. |
| 6,936,212 B1 * | 8/2005 | Crawford ............. B28B 1/00 264/308 |
| 7,014,713 B2 | 3/2006 | Nakane |
| 7,080,444 B1 * | 7/2006 | Craig ............... H01L 21/67144 257/E21.705 |
| 7,111,755 B2 | 9/2006 | Koyama et al. |
| 7,258,720 B2 | 8/2007 | Fuwa et al. |
| 7,277,664 B2 | 10/2007 | Katsuyama et al. |
| 7,406,278 B2 | 7/2008 | Katsuyama et al. |
| 7,479,297 B2 | 1/2009 | Miura |
| 7,536,139 B2 * | 5/2009 | Katsuyama ......... G03G 15/0874 222/DIG. 1 |
| 7,617,997 B2 | 11/2009 | Nagai |
| 7,673,978 B2 | 3/2010 | Miura et al. |
| 7,744,801 B2 * | 6/2010 | Owada ............... B29C 67/0055 264/401 |
| 7,767,130 B2 | 8/2010 | Elsner et al. |
| 7,776,492 B2 | 8/2010 | Miura |
| 7,867,431 B2 | 1/2011 | Higashi et al. |
| 7,887,316 B2 | 2/2011 | Cox |
| 7,887,877 B2 | 2/2011 | Morimoto et al. |
| 8,101,883 B2 | 1/2012 | Sukhman et al. |
| 8,172,562 B2 | 5/2012 | Mattes |
| 8,267,683 B2 | 9/2012 | Inoue |
| 8,282,377 B2 | 10/2012 | Higashi |
| 8,353,588 B2 | 1/2013 | Ishida |
| 8,550,802 B2 | 10/2013 | Fuwa et al. |
| 9,156,056 B2 * | 10/2015 | Abe .................... B29C 67/0077 |
| 2002/0020945 A1 | 2/2002 | Cho et al. |
| 2002/0033132 A1 * | 3/2002 | Kim ..................... B29C 44/322 118/407 |
| 2002/0041818 A1 | 4/2002 | Abe et al. |
| 2004/0021727 A1 | 2/2004 | Hirai |
| 2004/0065691 A1 * | 4/2004 | Weiperth ............... B65D 83/64 222/389 |
| 2004/0091642 A1 | 5/2004 | Murakami et al. |
| 2004/0182201 A1 | 9/2004 | Fuwa et al. |
| 2004/0217127 A1 | 11/2004 | Kimura et al. |
| 2004/0226929 A1 | 11/2004 | Miura et al. |
| 2004/0228754 A1 | 11/2004 | Abe et al. |
| 2005/0100660 A1 | 5/2005 | Ito et al. |
| 2006/0108712 A1 | 5/2006 | Mattes |
| 2006/0119012 A1 * | 6/2006 | Ruatta ................. B29C 67/0077 264/497 |
| 2006/0214335 A1 | 9/2006 | Cox |
| 2006/0230969 A1 | 10/2006 | Vosahlo |
| 2006/0256173 A1 * | 11/2006 | Tatsumi ............... B41J 2/17546 347/86 |
| 2007/0052787 A1 | 3/2007 | Miura et al. |
| 2008/0199227 A1 | 8/2008 | Kawai |
| 2008/0202413 A1 | 8/2008 | Seitz et al. |
| 2009/0025638 A1 | 1/2009 | Inoue |
| 2009/0084314 A1 | 4/2009 | Matsuyama |
| 2009/0169664 A1 | 7/2009 | Cox |
| 2009/0206177 A1 | 8/2009 | Hamamura et al. |
| 2010/0006228 A1 | 1/2010 | Abe et al. |
| 2011/0109016 A1 * | 5/2011 | Fuwa .................... B22F 3/1055 264/460 |
| 2011/0285061 A1 | 11/2011 | McAlea et al. |
| 2015/0224575 A1 * | 8/2015 | Hirata .................. B22F 3/003 524/503 |
| 2015/0273622 A1 * | 10/2015 | Manabe ............. B23K 15/0086 219/76.1 |
| 2016/0082695 A1 * | 3/2016 | Swartz .................. B29C 70/42 428/172 |

FOREIGN PATENT DOCUMENTS

| | | |
|---|---|---|
| DE | 10 2006 010 928 A1 | 11/2006 |
| JP | H07-501019 | 2/1995 |
| JP | H10-052799 | 2/1998 |
| JP | 2000-506080 | 5/2000 |
| JP | 2007-216595 | 8/2007 |
| WO | 93/08928 | 5/1993 |
| WO | 97/32671 | 9/1997 |

OTHER PUBLICATIONS

Japanese Office Action dated Jul. 13, 2010 and English summary thereof.

Chinese Office Action dated Dec. 31, 2010 and English translation thereof.

* cited by examiner (a)

(d)

APPARATUS FOR PRODUCING AN INTEGRALLY LAMINATED THREE-DIMENSIONAL OBJECT BY REPEATING FORMATION OF POWDER LAYER AND SOLIDIFIED LAYER

CROSS-REFERENCE TO RELATED APPLICATIONS

This application is a continuation application of U.S. patent application Ser. No. 12/461,176, filed Aug. 4, 2009, which claims benefit to Japanese Application No. 2008-202050, filed Aug. 5, 2008, the entire contents of which are incorporated herein by reference.

FIELD OF THE INVENTION

The present invention relates to an apparatus for producing a three-dimensional laminated object by irradiating a light beam on a specified portion of a powdery material and curing the specified portion layer-by-layer.

BACKGROUND OF THE INVENTION

Conventionally, there is known an apparatus for producing a three-dimensional laminated object, wherein a powder layer of an inorganic or organic powdery material is formed on a base, a light beam is irradiated on a specified portion of the powder layer to sinter and cure the powdery material in the specified portion to thereby form a solidified layer and the preceding steps are repeated while moving the base up and down so that the solidified layers are laminated into a single body (see, e.g., Japanese Patent Laid-open Publication No. 2002-115004).

FIGS. 9A and 9B partially illustrate the configuration of a conventional apparatus for producing a laminated object. The laminated object production apparatus includes a shaping unit 104 in which to form a powder layer and a solidified layer and a material supply unit 105 from which to supply a powdery material to the shaping unit 104. The shaping unit 104 includes a shaping table 140, an elevator 142 for moving the shaping table 140 upwards and downwards and a shaping frame 141 arranged to surround the shaping table 140. The material supply unit 105 includes a storage tank 151 for storing a powdery material, a lifting mechanism 152 and a lifting table 150 for pushing up the powdery material stored within the storage tank 151, and a material supply blade 120 for transferring an upper layer portion of the powdery material stored within the storage tank 151 onto the shaping table 140 and for leveling the surface of the powdery material transferred to the shaping table 140.

With this apparatus, a solidified layer is formed by sintering a specified portion of a powder layer on the shaping table 140 through the use of a solidified layer forming unit (not shown) that irradiates a light beam. Then, the shaping table 140 is moved downwards to form a next powder layer. Formation of the powder layer is performed by moving the lifting table 150 upwards by a short distance, bringing the upper layer of the powdery material stored in the storage tank 151 into a position a little higher than the upper surface of the shaping frame 141, and transferring the powdery material on the lifting table 150 to the shaping table 140 by the sliding movement of the material supply blade 120.

In the apparatus referred to above, it is sometimes the case that the height h2 of the material supply unit 105 becomes twice or more greater than the height h1 of the storage tank h1 in order to allow the lifting table 150 to make up-and-down movement. Such a structure of the material supply unit 105 results in an increase in the size of the apparatus. In addition, the powdery material stored in the storage tank 151 is placed in an open space and is, therefore, apt to be degraded by oxidization or moisture absorption. For that reason, the sintering and curing performed by the light beam becomes uneven, which may possibly reduce the precision and accuracy of the produced object. Moreover, if the powdery material is used up during a forming process and if it becomes necessary to feed the powdery material into the storage tank 151, there is no choice but to stop the apparatus. This leads to reduction in the work efficiency. Additionally, the powdery material is partly splashed in the feeding process thereof, thus making the apparatus dirty. It is impossible to carry out the material feeding operation in an easy and convenient manner.

SUMMARY OF THE INVENTION

In view of the above, the present invention provides an apparatus for producing a laminated object, which is small in size, capable of rendering a powdery material less susceptible to degradation caused by oxidization or moisture absorption and also capable of making it easy to feed the powdery material.

In accordance with an aspect of the present invention, there is provided an apparatus for producing a laminated object, including: a powder layer forming unit for forming a powder layer of a powdery material; a material supply unit for feeding the powdery material to the powder layer forming unit; and a solidified layer forming unit for forming a solidified layer by irradiating a light beam on a specified portion of the powder layer and sintering or melting the specified portion of the powder layer, the apparatus being configured to produce an integrally laminated three-dimensional object by repeating formation of the powder layer and formation of the solidified layer, wherein the material supply unit comprises a cartridge unit charged with the powdery material, the cartridge unit being configured to allow the powdery material to drop downwards.

With such configuration, the powdery material can be fed from the cartridge unit, which makes it possible to provide a low-profile compact apparatus for producing a laminated object. Since the powdery material is charged in the cartridge unit, it is possible to render the powdery material less susceptible to degradation caused by oxidization or moisture absorption. All that needs to be done in feeding the powdery material is to merely install the cartridge unit in a specified position. This makes it possible to feed the powdery material in an easy and convenient manner.

The apparatus may further include a transportation unit for clamping and transporting the cartridge unit.

With such configuration, even if the forming operation is underway, the cartridge unit can be transported by operating the transportation unit. This makes it possible to feed the powdery material in a timely manner.

The powder layer forming unit may include a powdery material storage unit, the material supply unit being configured to feed the powdery material charged in the cartridge unit to the powdery material storage unit.

Preferably, the powdery material storage unit is configured to allow the cartridge unit to be partially or fully inserted thereinto.

With such configuration, the powdery material is fed to a limited area, i.e., the powdery material storage unit. This prevents the powdery material from scattering over the forming unit or other parts, thus making it possible to feed the powdery material in an efficient manner.

Alternatively, the material supply unit may be configured to feed the powdery material charged in the cartridge unit onto a base on which the power layer and/or the solidified layer is formed or a base frame surrounding the base.

The cartridge unit may include a plurality of cartridge units connectable to one another.

With such configuration, the quantity of the powdery material fed at one time can be adjusted by changing the number of the cartridge units connected to one another.

The cartridge unit may be formed to have a downwardly tapering shape.

The cartridge unit may have an inner surface and a spiral groove or a spiral protrusion formed on the inner surface thereof.

With such configurations, the cartridge unit is shaped and arranged to prevent the powdery material from staying behind within the cartridge unit, which makes it possible to efficiently feed the powdery material.

The cartridge unit may have a bottom portion and a mouth formed in the bottom portion, the powdery material charged in the cartridge unit being dropped through the mouth.

The powder layer forming unit may include a needle portion for piercing the bottom portion of the cartridge unit.

With such configurations, it is possible to feed the powdery material from the cartridge unit to the powdery material storage unit with a simplified configuration.

The cartridge unit may have a powder dispensing mouth through which to feed the powdery material, the powder dispensing mouth being openable and closable.

With such configuration, the powder dispensing mouth of the cartridge unit can be selectively opened and closed. This makes it possible to adjust the feeding quantity of the powdery material in a timely manner.

The cartridge unit may have a powder dispensing mouth through which to feed the powdery material, the powder dispensing mouth being openable and closable, and the cartridge unit may be configured to allow the powder dispensing mouth to be opened when the cartridge unit is inserted into the powdery material storage unit.

With such configuration, the powder dispensing mouth of the cartridge unit can be opened when the cartridge unit is fitted to the powdery material storage unit. This makes it possible to reliably supply the powdery material.

The cartridge unit may be configured to allow the mouth to be opened in synchronism with movement of the powder layer forming unit.

With such configuration, the powder dispensing mouth of the cartridge unit is opened only when there exists a need to feed the powdery material. This makes it possible to feed the powdery material in a proper quantity and to suppress degradation of the powdery material.

The cartridge unit may have a screw installed therein.

With such configuration, the screw is rotated within the cartridge unit to stir the powdery material, which makes it possible to prevent the cartridge unit from clogging with the powdery material and to smoothly feed the powdery material. Even when the powder dispensing mouth of the cartridge unit is closed, it is possible to stir the powdery material charged in the cartridge unit. This makes it possible to keep uniform the particle size and homogeneity of powdery material components.

The apparatus may further include a drying unit for drying the powdery material charged in the cartridge unit.

With such configuration, the powdery material contained in the cartridge unit is subjected to heating, which makes it possible to prevent the powdery material from absorbing moisture.

The apparatus may further include a vibration unit for vibrating the cartridge unit.

With such configuration, there is no possibility that the powdery material stays behind within the cartridge unit. This ensures that the powdery material is completely used up with no waste.

The cartridge unit may have an internal space charged with the powdery material and kept hermetically sealed.

With such configuration, the powdery material is hardly degraded by oxidization or moisture absorption even when the cartridge unit is not in use. This makes it possible to preserve the cartridge unit for an extended period of time.

The cartridge unit may be made of a reusable plastic material or a paper material with sealability.

With such configuration, the cartridge unit is disposable, which enhances the convenience in using the cartridge unit.

The cartridge unit may include a memory for storing components of the powdery material charged in the cartridge unit.

With such configuration, the status of the powdery material charged in the cartridge unit can be recognized by reading the data of the memory.

DETAILED DESCRIPTION OF THE PREFERRED EMBODIMENTS

Figure 1A:
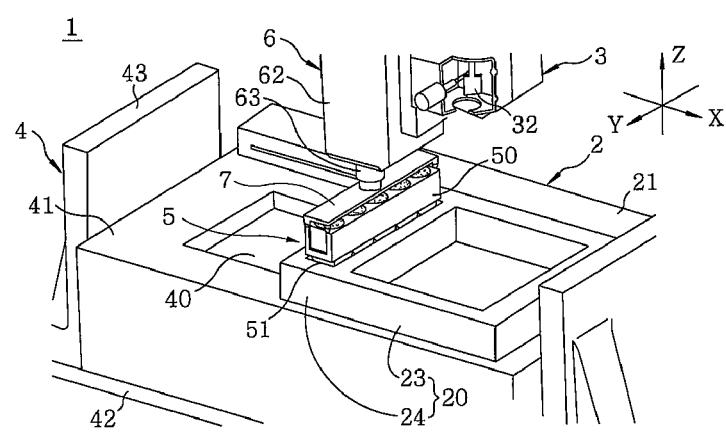
FIG. 1A is a perspective view showing an apparatus for producing a laminated object in accordance with a first embodiment of the present invention.
Figure 1B:
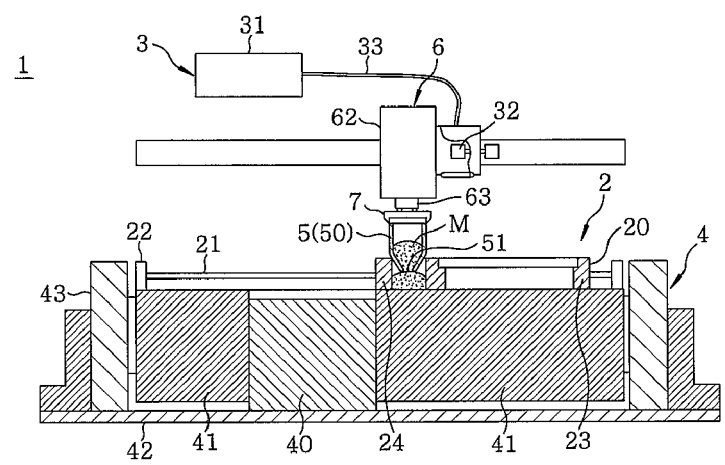
FIG. 1B is a partial side section view thereof.

An apparatus for producing a laminated object in accordance with a first embodiment of the present invention will now be described in detail with reference to FIGS. 1A and 1B.

The apparatus 1 of the present embodiment includes a powder layer forming unit 2 for forming a powder layer of an inorganic or organic powdery material M, an optical device 3 (or a solidified layer forming unit) for forming a solidified layer by sintering or melting a specified portion of the powder layer with a light beam, a shaping unit 4 having a base 40 on which the powder layer and the solidified layer are formed and a base frame 41 surrounding the outer circumference of the base 40, a cartridge unit 5 (or a material supply unit) for supplying the powdery material M to the powder layer forming unit 2, and a cutting unit 6 (or a transportation unit) for cutting the surface of an integrally laminated three-dimensional object and for transporting the cartridge unit 5. The cartridge unit 5 is charged with the powdery material M and is detachably attached to a suitable position of the powder layer forming unit 2.

The powder layer forming unit 2 includes a slide member 20 arranged for sliding movement along the upper surface of the base frame 41, a horizontal rail 21 arranged in parallel to the upper surface of the base frame 41 and a slide drive unit 22 for causing the slide member 20 to slide along the horizontal rail 21. The lower surface of the slide member 20 makes contact with the upper surface of the base frame 41. The slide member 20 moves along the horizontal rail 21 by the driving force of the slide drive unit 22 to bring the powdery material M onto the base 40.

The slide member 20 includes a slide frame 23 having a lower surface opening whose area is greater than that of the upper surface of the base 40 and a material storage frame 24 (or a powdery material storage unit) installed adjacent to the slide frame 23 for storing the powdery material M fed from the cartridge unit 5. Preferably, the material storage frame 24 is configured so that all or a part of the cartridge unit 5 can be inserted into the material storage frame 24.

The optical device 3 includes a light source 31 with a laser oscillator, a scanning mechanism 32 having a collecting lens and a galvanometer mirror for deflecting the irradiation direction of a light beam, and an optical fiber 33 for interconnecting the light source 31 and the scanning mechanism 32. If the powdery material M contains iron, a $CO_2$ laser or an Nd-YAG laser is used as the light source 31.

The shaping unit 4 includes a table 42 for holding the base 40 and an elevator 43 for moving the base frame 41 upwards and downwards, in addition to the base 40 and the base frame 41 set forth above. The base 40 is fixed to the table 42. A space surrounded by the inner surface of the base frame 41, namely a specified space into which the powdery material M is fed, is created above the base 40 as the base frame 41 is moved upwards by the elevator 43.

The cartridge unit 5 includes a housing 50 in which the powdery material M can be charged. In the bottom portion of the cartridge unit 5, there is formed a dispensing mouth 51 through which the powdery material M can be fed to the material storage frame 24. The cartridge unit 5 has, e.g., grooves or protrusions (not shown) formed on its outer surface so that a clamp unit 7 for interconnecting the cartridge unit 5 and the cutting unit 6 can be removably attached to the cartridge unit 5 with ease. The detailed configuration of the cartridge unit 5 will be described later. The clamp unit 7 has, e.g., a hook member for gripping or holding the cartridge unit 5. The clamp unit 7 is configured to clamp the cartridge unit 5 and unclamp the same in a specified position and at a predetermined timing. In addition, the clamp unit 7 has a connector portion by which the clamp unit 7 can be connected to the cutting unit 6.

The cutting unit 6 includes a headstock 61 that can be subjected to at least three-axis control with respect to the table 42, a processing machine 62 mounted to the headstock 61 and a spindle head 63 for holding an end mill used in cutting the surface of a three-dimensional object formed of integrally laminated solidified layers. The headstock 61 is configured to be driven in the X-, Y- and Z-axis directions as illustrated in FIG. 1A. Preferably, the headstock 61 may include a mechanism capable of automatically changing an end mill. As shown in FIGS. 1A and 1B, the optical device 3 is preferably configured so that it can be removably attached to the side surface of the processing machine 62.

The spindle head 63 is configured to engage and disengage with the clamp unit 7. By operating the headstock 61, the processing machine 62 and the spindle head 63, the cutting unit 6 can transport the cartridge unit 5 held by the clamp unit 7 to a specified position of the powder layer forming unit 2, e.g., onto the material storage frame 24 as shown in FIGS. 1A and 1B. Alternatively, the cartridge unit 5 may be detachably attached to the clamp unit 7 through the use of a magnetic force by providing a magnetic body in a specified position of the cartridge unit 5 and providing an electromagnet in the clamp unit 7. Although the cutting unit 6 also serves to transport the cartridge unit 5 in the present embodiment, a transportation unit dedicated to the transportation of the cartridge unit 5 may be provided independently of the cutting unit 6.

Figure 2A:
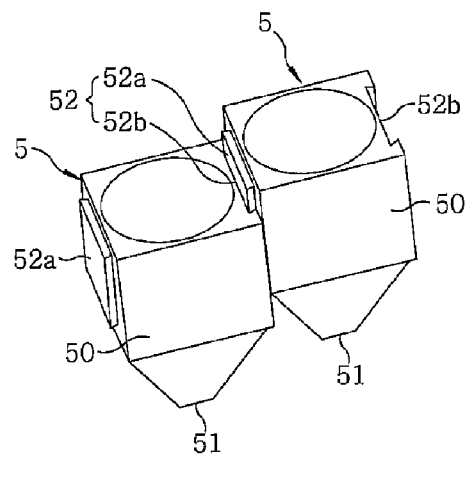
FIG. 2A is a perspective view showing a cartridge unit employed in the apparatus of the first embodiment.
Figure 2B:
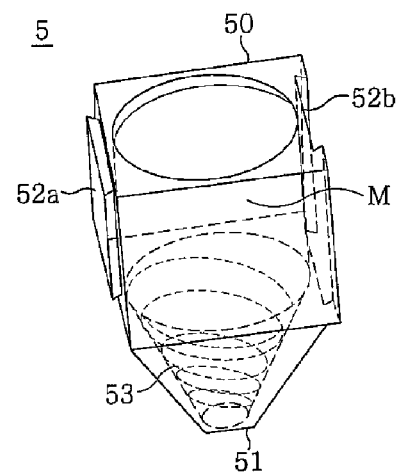
FIG. 2B is a partially see-through perspective view thereof.

The detailed configuration of the cartridge unit 5 will now be described with reference to FIGS. 2A and 2B. The cartridge unit 5 includes a connector mechanism 52 for connecting one cartridge unit to another. The connector mechanism 52 includes, e.g., a protrusion 52a and a groove 52b. If one cartridge unit is vertically slid relative to another, the protrusion 52a of one cartridge unit engages with the groove 52b of another cartridge unit. As an alternative example, a plurality of cartridge units 5 may be connected to one another through the use of a magnet. With this configuration, the quantity of the powdery material M fed at one time can be adjusted by changing the number of the cartridge units 5 connected. If the dispensing mouth 51 is made openable and closable, the powdery material M can be selectively fed to a specified position of the material storage frame 24. This makes it possible to avoid excessive supply of the powdery material M.

Preferably, the cartridge unit 5 is formed into such a shape as to allow the powdery material M charged in the cartridge unit 5 to fall with ease. More specifically, the cartridge unit 5 is formed to have a downwardly tapering shape. A spiral groove or protrusion 53 is preferably formed on the inner surface of the cartridge unit 5. This ensures that the powdery material M can be efficiently fed to the material storage frame 24 with no powdery material remaining within the cartridge unit 5.

The cartridge unit 5 is configured so that the internal space thereof can be hermetically sealed when the powdery material M is not fed. This ensures that the powdery material M is hardly degraded by oxidization or moisture absorption. More specifically, the housing 50 of the cartridge unit 5 defines a space fully closed except for the dispensing mouth 51 which is also closed when the powdery material M is not fed. An inert gas, e.g., nitrogen gas or argon gas, is filled in the housing 50. By doing so, the powdery material M is hardly degraded by oxidization or moisture absorption even when the cartridge unit 5 is not in use. This makes it possible to preserve the cartridge unit 5 for an extended period of time. It is preferred that the housing 50 of the cartridge unit 5 is made of, e.g., reusable plastic or paper with sealability.

This allows a user to dispose the cartridge unit 5 after its use, which enhances the convenience in using the cartridge unit 5.

Figure 3:
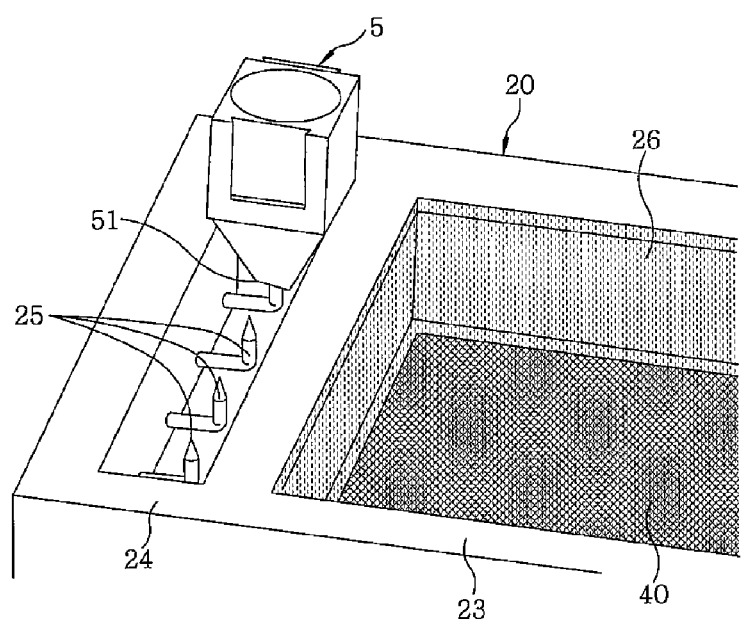
FIG. 3 is a perspective view for explaining a material supply method used in the apparatus of the first embodiment.

Next, a method of feeding the powdery material M from the cartridge unit 5 to the material storage frame 24 will be described with reference to FIG. 3. The dispensing mouth 51 formed in the bottom portion of the cartridge unit 5 is closed by a sealing material made of paper or aluminum foil. The material storage frame 24 of the powder layer forming unit 2 is provided with a needle portion 25 for piercing the bottom portion of the cartridge unit 5. If the cartridge unit 5 is transported onto the material storage frame 24 and if the dispensing mouth 51 is pushed into the material storage frame 24, the sealing member is pierced by the needle portion 25. As a result, the powdery material M charged in the cartridge unit 5 is dropped into the material storage frame 24. This makes it possible to feed the powdery material M from the cartridge unit 5 to the material storage frame 24 with a simplified configuration.

The cartridge unit 5 may be provided with a memory (not shown) for storing such data as the components of the powdery material M charged therein, the charging date of the powdery material M and the quantity of the powdery material M. This allows a user to recognize the status of the powdery material M charged in the cartridge unit 5 by reading the data of the memory with a data reading device (not shown). Preferably, the apparatus 1 includes a reading and writing device for reading and writing the data from and into the memory and a display unit (not shown) for displaying the data. The reading and writing device referred to herein performs the data reading operation or other operations in a contact or non-contact manner through the clamp unit 7 or the material storage frame 24. This allows a user to recognize, during a forming operation, the status of the powdery material M charged in the cartridge unit 5.

The detailed configuration of the slide member 20 will now be described with reference to FIG. 3. When a light beam is irradiated on a powder layer to sinter the same, it is sometimes the case that the powder layer makes contact with the ambient air and gets oxidized depending on the kind of the powdery material M used, which results in an undesired sintering. In view of this, the slide frame 23 having a window 26 is arranged on the base 40 in the sintering process. The light beam is irradiated in the state that an inert atmospheric gas is filled in the space surrounded by the base 40, the slide frame 23 and the window 26. This makes it possible to prevent the powder layer from making contact with the ambient air and, consequently, to avoid defective sintering which would otherwise occur by the oxidization of the powdery material M. Quartz glass is used as the window 26 if the light beam is a YAG laser beam, and zinc selenide or the like is used as the window 26 if the light beam is a $CO_2$ laser beam. The window 26 may be configured to serve as, e.g., an fθ lens, and not a simple parallel plate. This ensures that the spot of the light beam on the sintering surface has a uniform diameter, which makes it possible to perform the sintering with increased density.

Next, the operation examples of the apparatus 1 of the present embodiment will be described with reference to FIGS. 4A through 4F and FIGS. 5A through 5F. When the forming process is started, the elevator 43 keeps the base frame 41 moved up from the table 42 by a distance. The cartridge unit 5 is equipped with the clamp unit 7 and arranged above the base frame 41. The initial position of the cartridge unit 5 is not limited to the top of the base frame 41. Installation of the cartridge unit 5 in the initial position may be performed by a user or automatically performed by the cutting unit 6 or a dedicated transportation mechanism (not shown). In order to feed the powdery material M, the processing machine 62 is moved above the clamp unit 7. The spindle head 63 is extended and connected to the clamp unit 7 (see FIG. 4A).

Figure 4A:
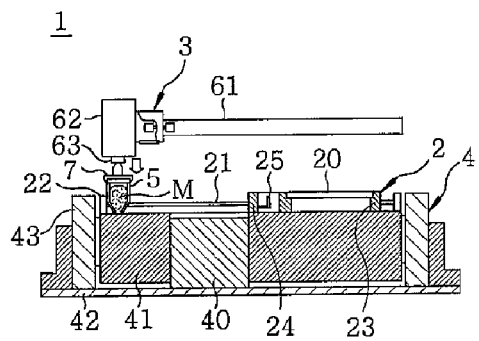
FIGS. 4A through 4F are partial side section views illustrating the operation examples of the apparatus of the first embodiment.
Figure 4D:
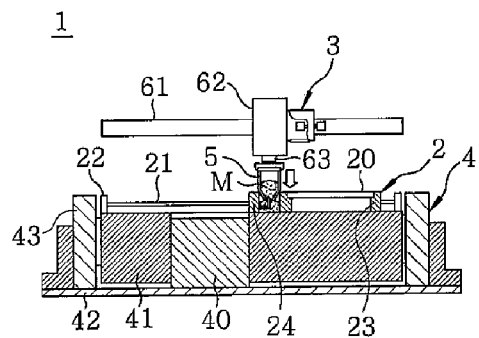
Figure 4B:
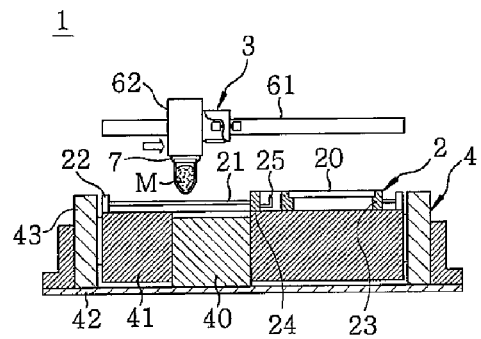
Figure 4E:
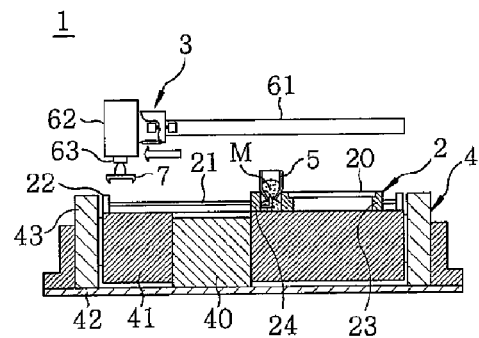
Figure 4C:
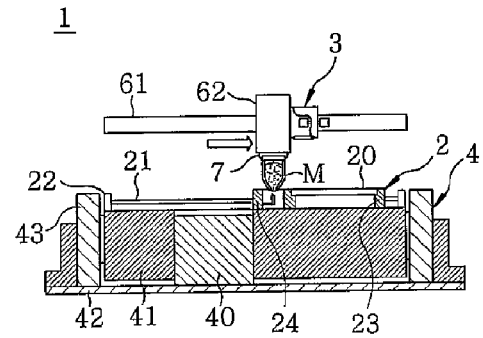
Figure 4F:
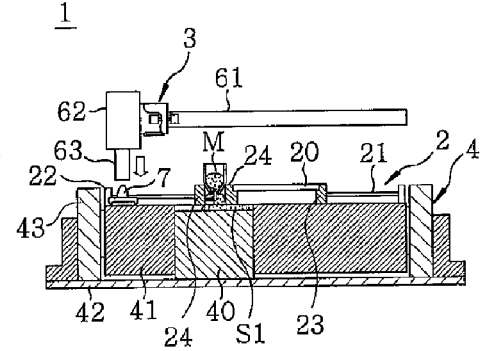

The processing machine 62 lifts up the cartridge unit 5 through the spindle head 63 and the clamp unit 7 and moves along the headstock 61 (see FIG. 4B), thus transporting the cartridge unit 5 to above the material storage frame 24 (see FIG. 4C). If the cartridge unit 5 is transported by the processing machine 62 in this manner, it becomes possible to feed the powdery material M in a timely manner without stopping the apparatus during the forming process.

Then, the processing machine 62 extends the spindle head 63 to bring the dispensing mouth 51 of the cartridge unit 5 into the material storage frame 24. As a result, the sealing material hermetically sealing up the dispensing mouth 51 is pierced by the needle portion 25 provided in the material storage frame 24, allowing the powdery material M charged in the cartridge unit 5 to drop into the material storage frame 24 (see FIG. 4D). Thus the powdery material M is fed to the limited area surrounded by the material storage frame 24 and is prevented from scattering over the upper surface of the base frame 41. The powdery material M can be efficiently fed to above the base 40 by causing the sliding movement of the slide member 20.

Thereafter, the clamp unit 7 is unclamped from the cartridge unit 5 and transported to a specified position (FIG. 4E). As the slide member 20 is slid along the horizontal rail 21, the powdery material M in the material storage frame 24 is supplied onto the base 40. At this time, the surface of the powdery material M is leveled to thereby form a first powder layer S1 (see FIG. 4F).

Figure 5A:
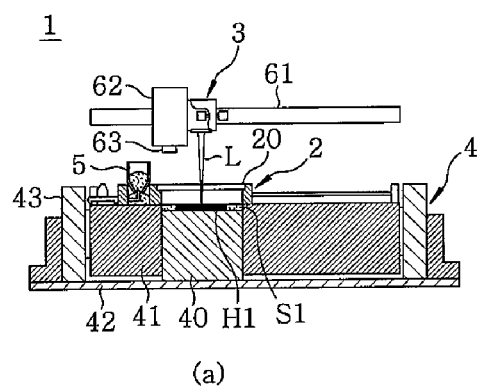
FIGS. 5A through 5F are partial side section views illustrating the operation examples of the apparatus of the first embodiment.
Figure 5D:
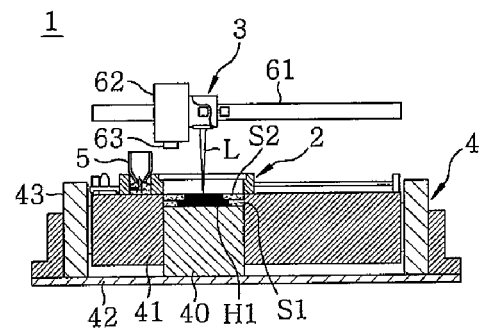

Subsequently, the optical device 3 irradiates a light beam L on a specified area of the powder layer S1 to sinter the powder in that area, thereby forming a first solidified layer H1 (FIG. 5A). The irradiation route (or hatching route) of the light beam L is preset from the three-dimensional CAD data of a laminated object. In other words, the irradiation route of the light beam L is set for each and every layer using the contour data of the respective cross-sections obtained by slicing, at an equal pitch, the STL (Standard Triangulation Language) data originating from a three-dimensional CAD model. At this time, the sintering is performed so that at least the outermost surface of a laminated object has high density (with the porosity of 5% or less) but the inner portion thereof shows low density. In other words, the shape model data are preliminarily divided into surface layer data and inner portion data. Then the light beam L is irradiated in such a sintering condition that the inner portion becomes porous while the surface layer is nearly melted to have high density. This makes it possible to obtain a three-dimensional object having a dense surface.

Figure 5B:
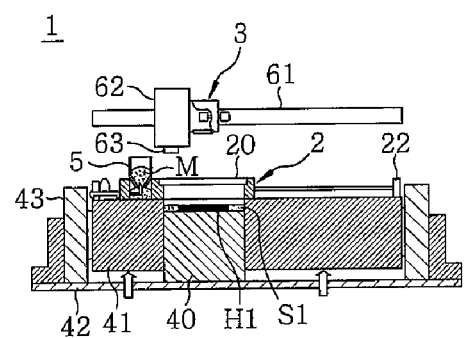
Figure 9A:
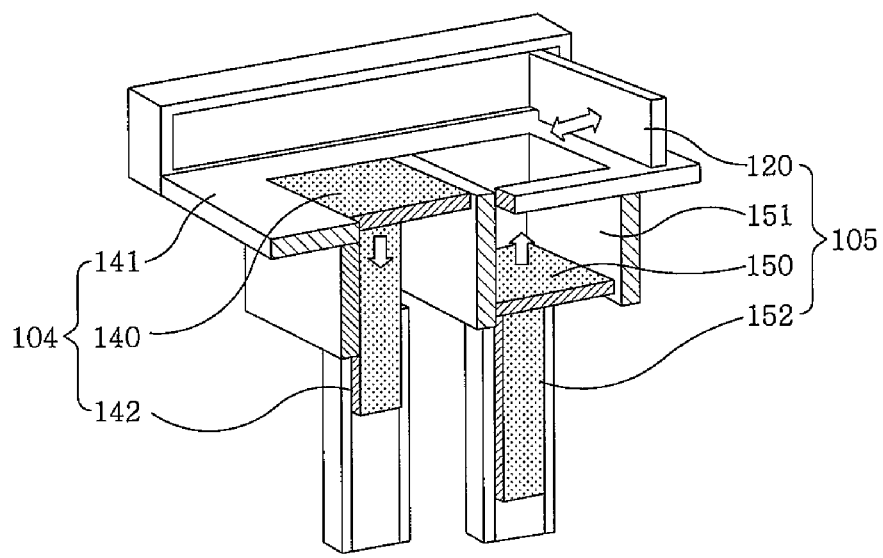
FIG. 9A is a partially cut-away perspective view showing a conventional apparatus for producing a laminated object.
Figure 9B:
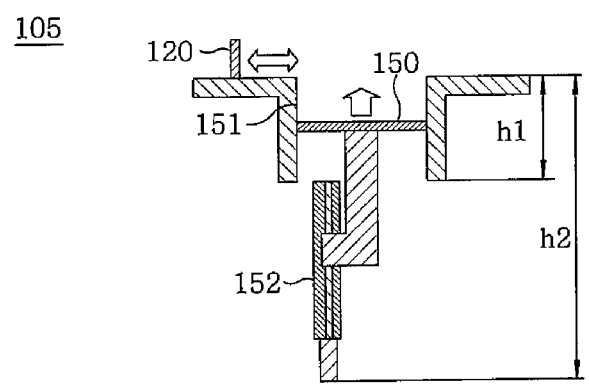
FIG. 9B is a side section view showing a material supply unit thereof.

After the sintering is performed, the elevator 43 pushes the base frame 41 up to a specified height (see FIG. 5B). The powdery material M is fed on the base 40 again to form a second powder layer S2 (see FIG. 5C). The height by which the base frame 41 is pushed up is set equal to the thickness of the second powder layer S2 laminated on the first powder layer S1 and the first solidified layer H1. The thickness of each of the powder layers S is set equal to about 0.05 mm in case of producing a laminated object, e.g., a shaping mold. The three-dimensional object in which a plurality of solidified layers H is integrally laminated one above another can be formed by repeating the formation of the powder layers S and the formation of the solidified layers H (see FIG. 5D). As set forth above, if the base frame 41 is moved up it becomes possible to laminate the solidified layers H without having to move the base 40. This makes it possible to produce three-dimensional objects with high accuracy. The present invention is not limited to the afore-mentioned configuration in which the base frame 41 is moved upwards while keeping the base 40 fixed. As an alternative example, it may be possible to employ a configuration in which the base is moved downwards while keeping the base frame fixed (see FIGS. 9A and 9B).

Figure 5E:
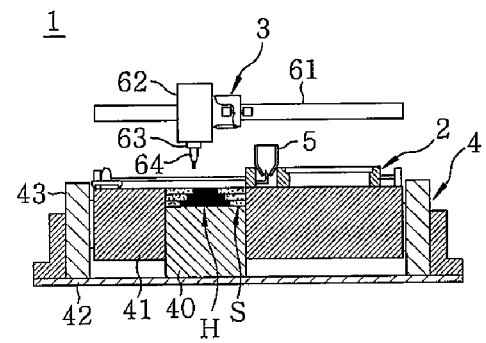
Figure 5C:
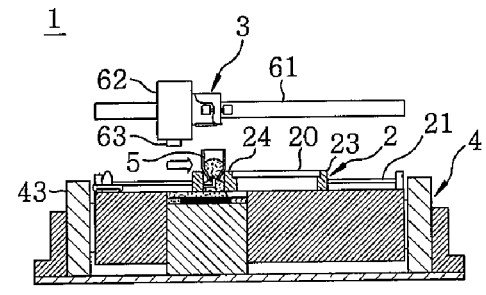
Figure 5F:
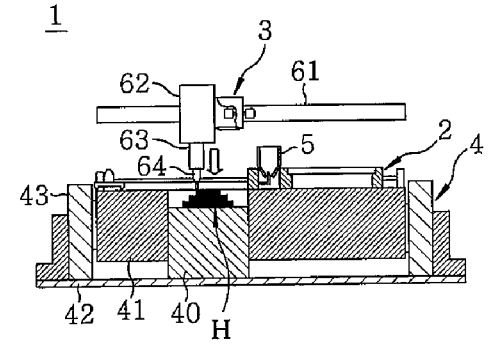

The steps shown in FIGS. 5A through 5D are repeatedly performed until the overall thickness of the solidified layers H thus laminated becomes equal to a value calculated from the length of the end mill 64 attached to the spindle head 63 of the processing machine 62. Then, the processing machine 62 is moved to above the base 40 and the surface of the integrally laminated three-dimensional object is cut with the end mill 64 (FIGS. 5E and 5F). Examples of the end mill 64 used herein include a two-blade type ball end mill made of cemented carbide. Depending on the shape to be cut or the purpose, it may be possible to use a square end mill, a radius end mill, a drill or the like. Just like the irradiation route of the light beam L, the cutting route tracked by the processing machine 62 is preset from the three-dimensional CAD data. The excess cured portion of powder attached to the surface of the three-dimensional object is removed by the cutting operation mentioned above, ensuring that the high-density portion is exposed on the surface of the three-dimensional object. After the cutting operation is performed by the processing machine 62, additional powder layers S and additional solidified layers S are repeatedly formed, eventually producing a desired three-dimensional object.

Preferably, the apparatus 1 of the present embodiment includes a dust removal unit (not shown) having an air pump, a suction nozzle and the like. Prior to the cutting operation performed by the processing machine 62, the dust removal unit removes the non-sintered excess powder for the sake of enhanced cutting accuracy. After the cutting operation, the chips generated in the cutting process are removed by the dust removal unit. More preferably, the dust removal unit includes a plurality of nozzles corresponding to the objects to be removed, i.e., the excess powder and the chips, which makes it possible to separately collect the excess powder and the chips.

With the configuration described above, the powdery material M can be fed by use of the cartridge unit 5. This makes it possible to reduce the height of the apparatus and to provide the apparatus which is more compact than the conventional one. The powdery material M is charged in the cartridge unit 5 and, therefore, is hardly degraded by oxidization or moisture adsorption. It is also possible to keep the apparatus from being contaminated by the powder during the material feeding process. In addition, the user can install the cartridge unit 5 in a specified position without having to touch the powdery material M, which makes it possible to feed the powdery material M in an easy and convenient manner.

Figure 6A:
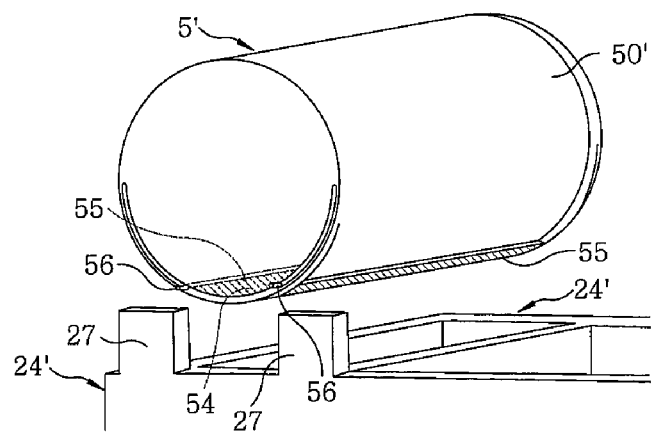
FIGS. 6A through 6C are perspective views for explaining the material supply sequence in an apparatus for producing a laminated object in accordance with a second embodiment of the present invention.
Figure 6B:
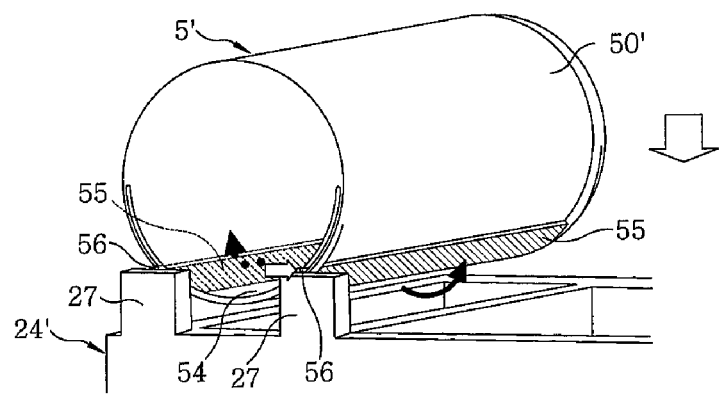
Figure 6C:
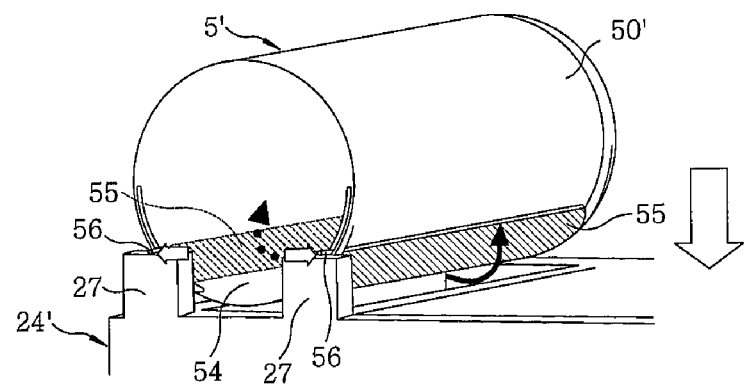

Next, an apparatus for producing a laminated object in accordance with a second embodiment of the present invention will be described with reference to FIGS. 6A through 6C. The apparatus 1 of the present embodiment differs from that of the first embodiment in the configuration of a cartridge unit 5' and a material storage frame 24'. In the present embodiment, a drum-shaped housing 50' is employed in the cartridge unit 5'. The housing 50 may be configured so that it can be partially or fully inserted into the material storage frame 24'. The cartridge unit 5' is provided in its bottom portion with a powder dispensing mouth 54 through which to feed the powdery material M to the material storage frame 24'. Lid plates 55 for opening and closing the powder dispensing mouth 54 are installed to slide along the powder dispensing mouth 54 and the side surface of the housing 50'. As in the first embodiment, the cartridge unit 5' of the present embodiment is transported by the cutting unit 6 and the clamp unit 7 having a shape conforming to that of the housing 50' (although not shown in FIGS. 6A through 6C).

The lid plates 55 are provided with lid levers 56 extending in the longitudinal direction of the cartridge unit 5', while the material storage frame 24' is provided with upwardly-protruding bars 27 positioned in alignment with the lid levers 56. The lid plates 55 are biased by springs or the like so as to close the powder dispensing mouth 54. Therefore, the powder dispensing mouth 54 is kept closed when the lid levers 56 and the bars 27 of the material storage frame 24' remain spaced apart from each other (see FIG. 6A). If the powder dispensing mouth 54 of the cartridge unit 5' is moved toward the material storage frame 24', the lid levers 56 come into contact with the bars 27 and make sliding movement along the side surface of the roller-shaped housing 50. At this time, the lid plates 55 are slid together with the lid levers 56 to open the powder dispensing mouth 54. Thus the powdery material M charged in the cartridge unit 5' falls down on the material storage frame 24' (see FIG. 6B). As the cartridge unit 5' is inserted into the material storage frame 24', the aperture area of the powder dispensing mouth 54 becomes greater, thereby increasing the quantity of the powdery material M fed from the cartridge unit 5'. By making the powder dispensing mouth 54 of the cartridge unit 5' openable and closable as set forth above, it is possible to adjust the feeding quantity of the powdery material M in a timely manner.

Alternatively, the cartridge unit 5' of the present embodiment may be configured so that the powder dispensing mouth 54 can be opened in synchronism with the movement of the powder layer forming unit 2. With this configuration, the powder dispensing mouth 54 can be opened only when there is a need to feed the powdery material M. This makes it possible to feed the powdery material M in a proper quantity and to suppress degradation of the powdery material M.

Figure 7:
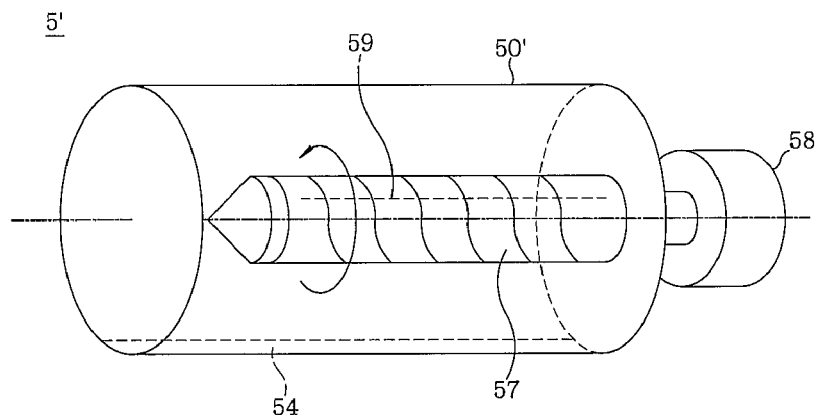
FIG. 7 is a partially see-through perspective view showing a cartridge unit used as a modified example in the apparatus of the second embodiment.

As a modified example of the present embodiment, the cartridge unit 5' may include a screw 57 contained therein as shown in FIG. 7. The screw 57 is driven by a motor 58. Since the screw 57 is rotated within the cartridge unit 5' to stir the powdery material M, it is possible to prevent the cartridge unit 5' from clogging with the powdery material M and to smoothly feed the powdery material M. Even when the powder dispensing mouth 54 of the cartridge unit 5' is closed, it is possible to stir the powdery material M charged in the cartridge unit 5'. This makes it possible to keep uniform the particle size and homogeneity of powdery material components.

Preferably, the cartridge unit 5' further includes a drying unit for drying the powdery material M charged therein. The drying unit may be, e.g., an electrothermal wire 59 arranged in the screw 57. Alternatively, it may be possible to arrange a heat transferring heater in the side wall of the cartridge unit 5'. This makes it possible to prevent the powdery material M charged in the cartridge unit 5 from absorbing moisture. The apparatus 1 may further include a vibration unit for vibrating the cartridge unit 5'. As the vibration unit, it may be possible to use, e.g., the mobility of the cutting unit 6 or the power of the motor 58 for driving the screw 57. By doing so, the powdery material M can be completely used up with no waste and with no possibility that the powdery material M stays behind within the cartridge unit 5'. It is preferred that the vibration unit is applied to the disposable cartridge unit 5 set forth above.

The present invention shall not be limited to the configurations of the foregoing embodiments but may be modified in many different forms. Although the cartridge unit 5 is preliminarily installed above the base frame 41 in the foregoing embodiments, the apparatus 1 may be provided with a cartridge accommodation portion for accommodating a plurality of cartridge units 5. More preferably, the apparatus 1 may be configured so that the transportation unit can automatically replace the cartridge unit 5 with a new one if the quantity of the powdery material M stored in the material storage frame 24 is reduced.

Figure 8:
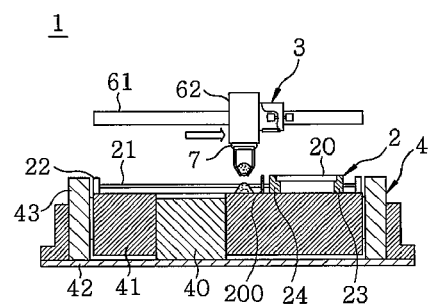
FIG. 8 is a schematic section view showing an apparatus for producing a laminated object in accordance with a modified embodiment of the present invention, in which the powdery material charged in a cartridge unit is not supplied to a material storage frame but to a base frame surrounding a base.

Although the foregoing embodiments are described with respect to the example that the powdery material M is fed into the material storage frame 24 and is leveled by sliding the material storage frame 24, the present invention is not limited to this example. For example, as shown in FIG. 8, it may be possible to use as the slide member 20 only a blade-shaped member 200 or the slide frame 23, either of which has a width greater than that of the base 40 so that it can level the surface of the powdery material M fed on the upper surface of the base 40. In this case, the powdery material M may be directly fed from the cartridge unit 5 to a specified position on the upper surface of the base frame 41 that surrounds the base 40 and then may be leveled by sliding the blade-shape member 200. Alternatively, the powdery material M may be directly fed from the cartridge unit 5 onto the base 40 (or the powder layer or solidified layer formed on the base 40). As a further alternative example, the material storage frame 24 alone may be used as the slide member 20.

While the invention has been shown and described with respect to the preferred embodiments, it will be understood by those skilled in the art that various changes and modification may be made without departing from the scope of the invention as defined in the following claims.

What is claimed is:

1. An apparatus for producing a laminated object, comprising:
    a powder layer forming unit configured to form a powder layer of a powdery material;
    a material supply unit configured to feed the powdery material to the powder layer forming unit; and
    a solidified layer forming unit configured to form a solidified layer by irradiating a light beam on a specified portion of the powder layer and sinter or melt the specified portion of the powder layer on a base and a base frame surrounding the outer circumference of the base, the apparatus being configured to produce an integrally laminated three-dimensional object by repeating formation of the powder layer and formation of the solidified layer,
    wherein the material supply unit comprises a cartridge unit charged with the powdery material, the cartridge unit being configured to allow the powdery material to drop downwards,
    wherein the powder layer forming unit includes a slide member which comprises a slide frame and a material storage frame, the material supply unit being configured to feed the powdery material charged in the cartridge unit to the material storage frame, and the slide member is arranged for sliding movement along an upper surface of the base frame, where the lower surface of the slide member makes contact with the upper surface of the base frame and the slide member moves along to bring the powdery material onto the base, where the slide member includes the slide frame which has a lower surface opening that has a greater surface area than an upper surface of the base;
    wherein the cartridge unit has a drum shape and has a powder dispensing mouth through which to feed the powdery material provided in a bottom portion thereof, the bottom portion being a sidewall of the cartridge unit and
    wherein the cartridge unit is provided with a lid plate configured to slide along the sidewall thereof to thereby, open and close the powder dispensing mouth.

2. The apparatus of claim 1, further comprising a transportation unit configured to clamp and transport the cartridge unit.

3. The apparatus of claim 1, wherein the material storage frame is configured to allow the cartridge unit to be partially or fully inserted thereinto.

4. The apparatus of claim 1, wherein the material supply unit is configured to feed the powdery material charged in the cartridge unit onto a base on which the powder layer and/or the solidified layer is formed or a base frame surrounding the base.

5. The apparatus of claim 1, wherein the powdery material charged in the cartridge unit is dropped by opening the bottom portion.

6. The apparatus of claim 1, wherein the cartridge unit is configured to allow the powder dispensing mouth to be opened when the cartridge unit is inserted into a material storage frame.

7. The apparatus of claim 6, wherein the cartridge unit is configured to allow the powder dispensing mouth to be opened in synchronism with movement of the powder layer forming unit.

8. The apparatus of claim 1, wherein the cartridge unit has a screw installed therein.

9. The apparatus of claim 1, further comprising a drying unit for drying the powdery material charged in the cartridge unit.

10. The apparatus of claim 1, wherein the cartridge unit has an internal space charged with the powdery material and kept hermetically sealed.

11. The apparatus of claim 1, wherein the cartridge unit is made of a reusable plastic material or a paper material with sealability.

12. The apparatus of claim 1, wherein the lid plate is provided with a lid lever extending in the longitudinal direction of the drum-shaped cartridge unit, and the powder dispensing mouth is opened and closed by the lid lever.

* * * * *